3,255,126
POLYURETHANE FOAM PREPARED FROM A HALOGEN CONTAINING POLYETHER
Stephen Fuzesi, Hamden, and Francisco Alberto Perico, West Redding, Conn., assignors to Olin Mathieson Chemical Corporation, a corporation of Virginia
No Drawing. Filed Mar. 23, 1962, Ser. No. 182,117
4 Claims. (Cl. 260—2.5)

The present invention relates to flame retardant rigid, flexible and semi-rigid polyurethane foams prepared from adducts of monomeric polyhydric alcohols and an epihalohydrin, wherein the halogen is selected from the group consisting of chlorine and bromine.

The rigid polyurethane foams have found wide and varied use in industry. For instance, they may be used as core materials between skins of many and varied compositions. In aircraft construction the foam may be enclosed between aluminum or fiber glass reinforced polyurethane skins to form an assembly which is rigid, strong and yet remarkably light. Because of their excellent electrical properties, polyurethane foams enclosed by fiber glass reinforced polyurethane skins have also found use in the construction of radomes. The polyurehane foams have another useful property, they develop a high degree of adhesion during the foaming process. As a result they will adhere to skins composed of such varied materials as metals, polyurethanes, ceramics, glass, etc. The resulting sandwich-type assemblies lend themselves well for use in such diverse fields as in the construction and insulation industries.

Flexible and semi-rigid polyurethane foams have also found wide and varied use in industry, for example, the flexible foams may be used in furniture for cushioning, in packaging, in mattresses, in automobile seats and sun visors, etc. and semi-rigid foams may be used in automobile crash pads and packaging, etc.

Heretofore, numerous attempts have been made to impart flame retardance to polyurethane foams in view of the numerous applications where a flame retardant polyurethane foam is desirable. A typical method for imparting flame retardance to polyurethane foams includes the use of flame retardant additives, such as antimony trioxide. Although these processes achieve a certain degree of flame retardance, the additives employed are not chemically combined in the foam, but are merely present in mechanical admixture; therefore, permanent and uniform flame reardance cannot be obtained. In addition, the flame retardant additives are progressively lost during the process, thus increasing the cost, and also frequently degrading desirable properties of the foam. An additional problem presented mainly in flexible polyurethane foams is that the foam will melt when it burns and the melt is also flammable, thus providing a dangerous running fire.

It is, therefore, an object of the present invention to provide a rigid, flexible or semi-rigid polyurethane foam with built-in flame retardance.

It is a further object of the present invention to provide a flame retardant polyurethane foam which may be easily and expeditiously prepared and which is characterized by good physical properties.

It is a further object of the present invention to provide a polyurethane foam as above which is characterized by low raw material cost.

Further objects and advantages of the present invention will appear hereinafter.

In accordance with the process of the present invention it has now been found that the foregoing objects may be obtained and flame retardant polyurethane foams prepared by reacting together (1) the adduct of a monomeric polyhydric alcohol and an epihalohydrin, wherein the halogen is selected from the group consisting of chlorine and bromine, said adduct having a hydroxyl number of between 30 and 800, (2) an organic polyisocyanate in an amount of at least 0.7 NCO groups based on the number of hydroxyl groups present, (3) a foaming agent and (4) a reaction catalyst.

The polyurethane foams of the present invention are self-extinguishing and retain their self-extinguishing qualities after long exposure to elevated temperature, thus widely expanding their range of utility. In addition, the adducts of polyhydric alcohol and epihalohydrin may be prepared from inexpensive raw materials and may be tailor-made to suit desired viscosity and hydroxyl number conditions.

The adducts of a polyhydric alcohol and epihalohydrin are polyhydroxypolyoxyalkylene ethers and are prepared by the polymerization of a polyhydric alcohol, or a mixture of polyhydric alcohols, with an epihalohydrin in the presence of an acidic catalyst. A preferred catalyst is boron trifluoride etherate. Other known catalysts for this type of reaction may be conveniently employed such as aluminum trichloride, stannic chloride, titanium tetrachloride, etc.

By polymerization of a polyhydric alcohol or a mixture of polyhydric alcohols, with the epihalohydrin, all of the polyhydroxy nuclei are substituted by polyalkylene ether chains. The methods of preparation of the adducts vary greatly depending upon specific reagents employed. The proportion of polyhydric alcohol to epihalohydrin will depend upon the hydroxyl number which is desired. When the adducts are employed in the preparation of a rigid polyurethane foam the molar ratio of epihalohydrin to polyhydric alcohol should be such that the resultant material has a hydroxyl number between 300 and 800. In the semi-rigid polyurethane foams the hydroxyl number should be between 100 and 300. In the flexible polyurethane foams the hydroxyl number should be between about 30 and 100.

In the preparation of adducts of the present invention any monomeric polyhydric alcohol may be employed. The polyhydric alcohol contains at least two hydroxyl groups and may be aliphatic or aromatic, saturated or unsaturated. The preferred polyhydric alcohols are glycerol and pentaerythritol due to availability and ease of reaction. Others which may be employed include, but are not limited to, the following: ethylene glycol, propylene glycol, 1,4-butanediol, diethylene glycol, dipropylene glycol, neopentyl glycol, triethylene glycol, hexamethylene glycol, hexanetriol, butanetriol, trimethylol propane, trimethylol ethane, polyglycerol, dipentaerythritol, polypentaerythritol, erythritol, mannitol, sorbitol, 2-butene-1,4 - diol, 2 - butyne-1,4-diol, p,p′-isopropylidenediphenol, resorcinol, catechol, hydroquinone, alkyl glucosides such as methyl glucoside, 4,4′-dihydroxybenzophenone, mono-, di-, and polysaccharides, such as glucose, sucrose, lactose and starch, etc.

The temperature of the reaction between the polyhydric alcohol and the epihalohydrin will naturally vary depending on the reactants employed, amounts thereof and the reaction time. Generally, however, the reaction is conducted in the temperature range of between about 50 and 150° C. Similarly, the reaction time will also vary depending upon the temperature of the reaction, the reactants employed, and the amounts thereof. Generally, however, a reaction time in the range of between about 30 minutes and 10 hours is employed.

Any organic polyisocyanate may be employed in the preparation of the polyurethane foams. This includes diisocyanates, triisocyanates, and polyisocyanates. Naturally the organic diisocyanates are preferred due to commercial availability, especially mixtures of isomers of tolylene diisocyanate which are readily available commercially. Typical exemplificative isocyanates include, but are not limited to, the following: methylene-bis-(4-phenyl isocyanate), 3,3'-bitolylene-4,4'-diisocyanate, 3,3'-dimethoxy-4,4'-biphenylene diisocyanate, naphthalene-1,4-diisocyanate, hexamethylene diisocyanate, 1,4-phenylene diisocyanate, etc. The amount of isocyanate employed in the preparation of the polyurethane foams should be sufficient to provide at least 0.7 NCO groups based on the number of hydroxyl groups present in the adduct of the present invention, the number of hydroxyl groups in any additive employed and the number of hydroxyl groups employed in the foaming agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,-1,2-trichloro-1,2,2,-trifluoroethane, methylene chloride, chloroform and carbon tetrachloride. The amount of foaming agent employed may be varied within a wide range. Generally however, the halogenated hydrocarbons are employed in an amount of from 1 to 50 parts by weight per 100 parts by weight of the adduct of the present invention, and generally the water is employed in an amount of from 0.1 to 10 parts by weight per 100 parts by weight of the adduct of the present invention.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, the following: N-methyl morpholine, N-hydroxyethyl morpholine, triethylene diamine, triethylamine, trimethylamine. Typical metallic salts include, for example, the salts of antimony, tin and iron, e.g., dibutyltin dilaurate, stannous octoate, etc. Generally speaking, the catalyst is employed in an amount of from 0.1 to 2.0 percent by weight based on the adduct of the present invention.

The polyurethane foams of the present invention may be prepared directly from the reaction between the polyhydroxypolyoxyalkylene ether and organic polyisocyanate in the presence of a foaming agent and reaction catalyst. Optionally, various additives may be employed in the preparation of the polyurethane foams in order to achieve particular properties. Exemplificative of such additives include, but are not limited to, the following: monocarboxylic acids, polycarboxylic acids, polyesters, monohydroxy compounds, polyhydroxy compounds, etc.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of adduct.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The present invention will be more readily apparent from a consideration of the following illustrative examples.

*Example I—Preparation of polyepichlorohydrinated glycerol*

Into a 5 liter three-necked reaction vessel was charged 920 grams of glycerol and 2 cubic centimeters of boron trifluoride diethyl ether complex. Heat was then applied to the reactor and the temperature gradually brought to 70° C. Then epichlorohydrin was added to the gently agitated reaction mixture at a rate such as to maintain the temperature between 75° C. and 135° C. The reaction is exothermic. The addition of epichlorohydrin was continued for a period of about 7 hours until 3280 grams of epichlorohydrin had been added. After all of the epichlorohydrin was added, the temperature was maintained at 100° C. for an additional hour. The reaction mirture was then neutralized with a sodium bicarbonate-water mixture. Three percent of Attapulgus clay was added and the mixture wass tripped at 100°–105° C./2 millimeters for two hours. After filtration the product given is a slightly viscous, slightly colored liquid of polyepichlorohydrinated glycerol having the following analysis:

| | |
|---|---:|
| Hydroxyl No. mgKOH/g. | 439 |
| Acid No. mgKOH/g. | 0.2 |
| pH | 8.0 |
| H₂O percent | 0.2 |
| Cl₂ percent | 29.18 |
| Viscosity at 100° F. c.s. | 1312 |

*Example II—Preparation of polyurethane foam from Example I*

To 100 grams of the product of Example I was added 25 grams of trifluorochloromethane and the mixture was stirred until homogenous. When the mixture became homogenous, 1.5 grams of silicone oil and 0.2 gram of stannous octoate were added and the mixture stirred until homogenous. When the mixture became homogenous 75.5 grams of a mixture of isomers of tolylene diisocyanate were added (about 80 percent 2,4-tolylene diisocyanate and 20 percent 2,6-tolylene diisocyanate). The resultant mixture was stirred for about 15 seconds, poured into a mold and allowed to cure at room temperature to a rigid polyurethane foam having a good cell structure, and a density of 2.6 pounds per square inch. The foam had a compressive strength of 14 p.s.i. at room temperature. When the foam was subjected to the ASTM D 1692–59T flame test it was self-extinguishing and upon heat aging for 7 days at 140° F. the foam was still self-extinguishing.

*Example III—Preparation of polyepichlorohydrinated monopentaerythritol*

Into a three liter three-necked reaction vessel 410 grams of pentaerythritol was charged. Heat was then applied to the reactor and the temperature gradually brought to 230 to 240° C. When all of the pentaerythritol was melted 2 cubic centimeters of boron trifluoride diethyl ether complex was added to the gently agitated pentaerythritol. Epichlorohydrin was then added at a rate such as to maintain the temperature between 85 to 160° C. The reaction is exothermic. The addition of epichlorohydrin was continued for a period of about 3 hours until 1300 grams of epichlorohydrin had been added. Then the temperature was maintained at 100 to 105° C. for an additional hour. The reaction mixture then was neutralized using sodium bicarbonate-water mixture. After addition of 3 percent Attapulgus clay the mixture was stripped at 100 to 105° C./2 millimeters for two hours. After filtration the product given is a viscous, yellowish colored liquid of polyepichlorohydrinated pentaerythritol having the following analysis:

| | |
|---|---|
| Hydroxyl No. mgKOH/g. | 390.0 |
| Acid No. mgKOH/g. | 0.036 |
| pH | 7.7 |
| $H_2O$ percent | 0.15 |
| $Cl_2$ percent | 27.90 |
| Viscosity at 100° F. c.s. | 8039 |

*Example IV—Preparation of polyurethane foam from Example III*

A rigid polyurethane foam was prepared in a manner after Example II from the following ingredients:

100 grams of the prodcut of Example III
25 grams of trifluorochloromethane
1 gram of silicone oil
0.8 gram of dibutyltin dilaurate and
65 grams of a mixture of isomers of tolylene diisocyanate.

The resultant rigid polyurethane foam had a good cell structure, a density of 2.1 pounds per cubic foot, a tensile strength of 34.0 p.s.i. and a compressive strength of 16 p.s.i. at room temperature. When subjected to the foregoing ASTM flame test the foam was self-extinguishing and was still self-extinguishing after 7 days of heat aging at 140° F.

*Example V—Preparation of copolymerized epichlorohydrinated glycerol and epichlorohydrinated dipentaerythritol*

One mole of glycerol and two moles of dipentaerythritol were charged into a three liter three necked reaction vessel. Heat was then applied to the reactor and, gently agitated, the mixture was heated until all of the dipentaerythritol was melted, giving a light colored liquid. Two cubic centimeters of borontrifluoride diethyl ether complex was then added slowly to the hot liquid, and the addition of epichlorohydrin was started. During the addition of the first part of the epichlorohydrin, the temperature was gradually decreased to 130 to 140° C. keeping the dipentaerythritol in solution. The larger part of epichlorohydrin was then added at 130 to 140° C. When all of the 1550 grams of epichlorohydrin was added the temperature was maintained at 100° C. for an additional hour. After neutralization of the reaction mixture by sodium bicarbonate-water mixture, three percent of Attapulgus clay was added and the mixture was stripped at 100 to 105° C./2 millimeters for two hours. After filtration the product was a viscous, slightly brown colored liquid having the following analysis:

| | |
|---|---|
| Hydroxyl No. mgKOH/g. | 353 |
| Acid No. mgKOH/g. | 0.02 |
| pH | 8.2 |
| $H_2O$ percent | 0.11 |
| $Cl_2$ percent | 26.57 |
| Viscosity at 100° F. c.s. | 17498 |

*Example VI—Preparation of polyurethane foam from Example V*

A rigid polyurethane foam was prepared in a manner after Example II from the following ingredients:

100 grams of the product of Example V
25 grams of trifluorochloromethane
2.0 grams of silicone oil
0.2 gram of dibutyltin dilaurate and
59 grams of a mixture of isomers of tolylene diisocyanate.

The resultant rigid polyurethane foam had a good cell structure, a density of 1.8 pounds per cubic foot, a tensile strength of 27.7 p.s.i. and a compressive strength of 18.6 p.s.i. at room temperature. When subjected to the foregoing ASTM flame test the foam was self-extinguishing and was still self-extinguishing after 7 days of heat aging at 140° F.

*Example VII—Preparation of copolymerized epichlorohydrinated glycerol and epichlorohydrinate starch*

Into a three liter, three-necked reaction vessel 92 grams of glycerol was charged. Heat was then applied to the reactor and the temperature gradually brought to 120 to 140° C. Then 180 grams of starch was slowly added into the hot glycerol. When all of the starch was melted 2 cubic centimeters of borontrifluoride diethyl etherate was slowly added into the mixture. During the addition of the first part of the epichlorohydrin the temperature was gradually decreased to 100 to 120° C. The temperature was maintained in this range and 850 grams of epichlorohydrin was added. The reaction is exothermic. After addition of epichlorohydrin the reaction mixture was neutralized using sodium bicarbonate-water mixture. After purification the product given is a viscous, brown colored liquid having the following analysis:

| | |
|---|---|
| Hydroxyl No. mgKOH/g. | 294 |
| Acid No. mgKOH/g. | 0.13 |
| pH | 7.6 |
| $H_2O$ percent | 9.18 |
| $Cl_2$ percent | 28.33 |
| Viscosity at 100° F. c.s. | 28148 |

*Example VIII—Preparation of polyurethane foam from Example VII*

A rigid polyurethane foam was prepared in a manner after Example II from the following ingredients:
100 grams of the product of Example VII
25 grams of trifluorochloromethane
1.3 grams of silicone oil
0.2 gram of stannous octoate and
50 grams of a mixture of isomers of tolylene dissocyanate The resultant rigid polyurethane foam had a good cell structure, a density of 2.2 pounds per cubic foot, a tensile strength of 26.3 p.s.i. and a compressive strength of 10.0 p.s.i. at room temperature. When subjected to the foregoing ASTM flame test the foam was self-extinguishing and was still self-extinguishing after 7 days at 140° F.

This invention may be embodied in other forms or carried out in other ways without depating from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A polyurethane foam prepared by the process which comprises reacting together (1) the haloegn-containing adduct obtained by reacting a mixture of polyhydric alcohols, one of said polyhydric alcohols being starch and one of said polyhydric alcohols being a polyhydric alcohol other than starch, to obtain a reaction product, and reacting with said reaction product an epihalohydrin selected from the group consisting of epichlorohydrin and epibromohydrin in the presence of an acidic catalyst, said adduct having a hydroxyl number between 30 and 800, (2) an organic polyisocyanate in an amount of at least 0.7 NCO groups based on the number of hydroxyl groups present, in the presence of (3) a foaming agent and (4) a reaction catalyst.

2. A polyurethane foam according to claim 1 wherein said adduct (1) is the adduct of epichlorohydrin and a mixture of starch and pentaerythritol.

3. The polyurethane foam of claim 1 wherein said epihalohydrin is epichlorohydrin.

4. A polyurethane foam prepared by the process which comprises reacting together (1) the chlorine-containing adduct obtained by reacting glycerol and starch, to obtain a reaction mixturt and reacting epichlorohydrin with said reaction mixture in the presence of an acidic catalyst, said adduct having a hydroxyl number between 30 and 800, (2) an organic polyisocyanate in an amount of at least 0.7 NCO groups based on the number of hydroxyl groups present, in the presence of (3) a foaming agent and (4) a reaction catalyst.

References Cited by the Examiner

UNITED STATES PATENTS

| 2,581,464 | 1/1952 | Zech | 260—348 |
| 2,853,472 | 9/1958 | Schroeder et al. | 260—2.5 |
| 2,935,510 | 5/1960 | Wurzburg | 260—233.3 |
| 2,996,498 | 8/1961 | Jarwenko | 260—233.3 |
| 3,054,760 | 9/1962 | Worsley et al. | 260—2.5 |
| 3,055,845 | 9/1962 | Merten et al. | 260—2.5 |

LEON J. BERCOVITZ, *Primary Examiner.*

D. E. CZAJA, *Assistant Examiner.*